April 5, 1966   R. G. ROHLFING ET AL   3,244,681
PRESSURE RELIEF SYSTEM FOR PRESSURE VESSELS
Filed July 6, 1961
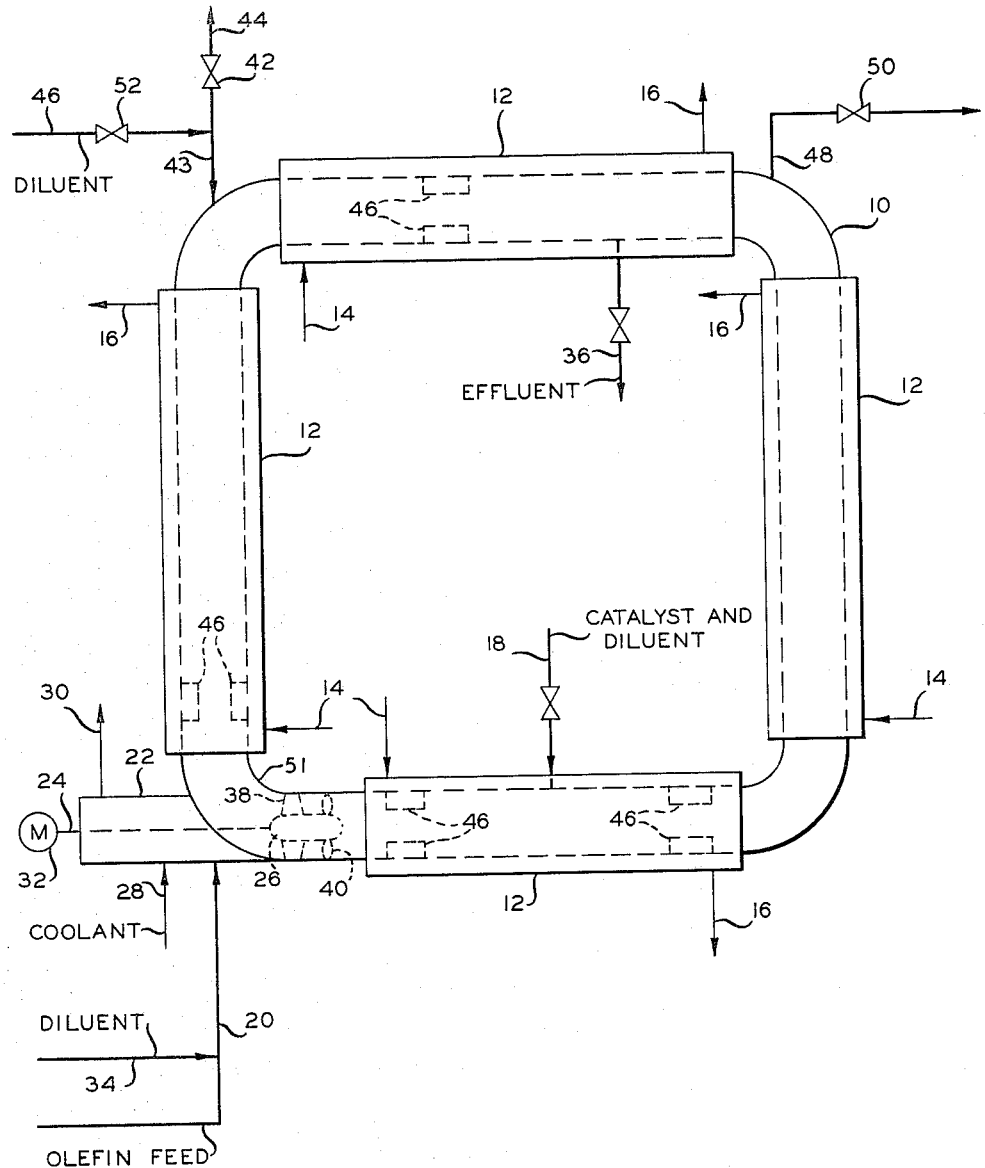
INVENTORS
R. G. ROHLFING
S. J. MARWIL
BY
Hudson and Young
ATTORNEYS

United States Patent Office

3,244,681
Patented Apr. 5, 1966

3,244,681
PRESSURE RELIEF SYSTEM FOR PRESSURE VESSELS
Raymond G. Rohlfing and Stanley J. Marwil, Bartlesville, Okla., assignors to Phillips Petroleum Company, a corporation of Delaware
Filed July 6, 1961, Ser. No. 122,282
4 Claims. (Cl. 260—88.2)

This invention relates to a pressure relief system for pressure vessels. In one aspect the invention relates to relieving pressure surges in a pressure vessel. In another aspect the invention relates to the prevention of malfunctioning of pressure relief valves utilized in conjunction with pressurized vessels.

It is well known to utilize a pressure relief valve or rupture disc or some other type of valving means for the relief of excessive pressure within pressurized vessels. By the use of relief valves, the valve is either opened or sacrificed so as to permit the expanding contents of the vessel to escape through the valve rather than rupture the vessel itself. Conventionally, pressure relief valves are in open communication with the interior of the reactor so that the contents of the vessel are in intimate contact with the valve during normal operation. It is imperative that the relief valve be able to withstand prolonged contact with materials which are highly corrosive or agglomerative or otherwise deleterious to valve operation and yet be instaneously operable upon demand. Heretofore, it has been the conventional practice to periodically remove the valve and thoroughly clean it so as to insure proper operation. This is a costly and time-consuming operation and only partially insures success.

It is an object of this invention to provide an improved method and apparatus for the relief of excessive pressure in a pressurized vessel.

It is another object of this invention to provide an improved method and apparatus for the continual maintenance of pressure relief valves in operative condition.

These and other objects of the invention will become readily apparent to those skilled in the art on consideration of the following disclosure, drawing and claims.

The foregoing objects are broadly realized by continuously introducing a fluid into the conduit connecting the pressure relief valve and the interior of the pressure vessel so that fluid continuously flows toward the interior of the reactor.

This invention is broadly applicable to the relief of excessive pressure in any type of pressurized vessel whose contents tend to be detrimental to the operation of a pressure relief system which is in communication with the interior of said vessel. For purposes of simplification, this invention will be described with reference to the utilization of a continuous path loop reactor for the formation of particle form polymers of ethylene and mixtures of ethylene with other unsaturated hydrocarbons such as described in the copending application of Donald D. Norwood, Serial No. 819,391, filed June 10, 1959, now abandoned. In this copending application method and apparatus are described for reducing the fouling of reaction surfaces by carrying out the polymerization reaction in a tubular closed loop reaction zone with smooth surfaces. The catalyst, liquid diluent and hydrocarbon reactants are continuously moved through the reaction zone at a velocity sufficient to prevent polymer deposition and in the highly turbulent flow range thereby producing a solid particle from polymer product which is then withdrawn from the reaction zone.

It is disclosed in Hogan et al., U.S. Patent 2,825,721, that polymers and copolymers can be produced by contacting one or more olefins with a catalyst comprising as an essential ingredient chromium oxide, preferably including a substantial amount of hexavalent chromium. The chromium oxide is associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. The term "polymer," as used herein, includes homopolymers and copolymers. Copolymers, such as ethylene-propylene copolymers and ethylene-butene-1 copolymer, can also be prepared by utilizing the chromium oxide-containing catalyst. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspendend in the liquid diluent in solid particle form. The preparation of insoluble particle form polymer is disclosed in the copending application of Leatherman et al., Serial No. 590,567, filed June 11, 1956, now abandoned. In the following discussion the term "particle form polymer" will be employed to designate the insoluble polymers of ethylene formed in accordance with the Leatherman et al. application.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentene, 1-hexene, and the like. Examples of comonomers which can be used with ethylene include 1-olefins having no branching nearer the double bond than the 4-position and conjugated and nonconjugated diolefins. The polymerization reaction is carried out in the presence of a liquid hydrocarbon diluent which is inert in the polymerization reaction and in which the majority of the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. The polymerization reaction temperature will vary depending on the particular liquid diluent which is employed and on the olefins reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent. For a more detailed description of the polymerization process including reaction conditions, catalyst, etc., reference can be had to the copending application of Leatherman et al., Serial No. 590,567, filed June 11, 1956. The solid particulate polymer product is removed from the polymerization reactor by any suitable means, such as a settling leg with a single or double take-off valve for periodic removal of product with a minimum loss of pressure and diluent. Suitable means are described in the copending application of J. S. Scoggin, Serial No. 19,007, filed March 31, 1960.

By conventional practices a pressure relief valve or rupture disc is installed in a conduit which is in direct open communication with the interior of the loop reactor, thereby providing a safety means for the passage of reactor contents during periods when the reactor pressure exceeds the predetermined safety limit of the reactor walls. However, since the polymer is formed in solid particulate form and the vessel is operated at elevated pressures, e.g. 450 p.s.i., it is possible for polymer product to become lodged in the passageway connecting the vessel to the pressure relief valve or to become lodged in the relief valve itself so as to render the valve inoperative during periods of emergency or slight pressure rises.

By the method and apparatus of this invention a continuous flow of fluid, such as the diluent used within the reactor, is injected into the passageway between the relief valve and the reactor. This insures a positive flow through the conduit toward the reactor, thereby precluding the possibility of solids being in either the passageway or the relief valve. If the pressure within the reactor should rise above a determined safety limit, the diluent pressure is exceeded and the diluent is forced out of the passageway permitting the reactor contents to escape through the relief valve. The selection of the particular type of relief valve is readily determined by one skilled in the art by routine engineering considerations. A suitable relief valve is Consolidated Model No. 1910-30-FC described in Catalog No. 1900 by Manning, Maxwell and Moore, Inc., Stratford, Connecticut. The selection of a particular type of valve depends upon such factors as the geometry of the system, the temperature, the viscosity, the back pressure pulsation, crystallization, the presence of slurries, specific gravity, corrosion, flow capacity and the like. It is to be understood that the valve may be used in series or in parallel with other types of relief mechanism, e.g. a rupture disc.

Flow rate toward the pressurized vessel need be only sufficient to prevent retrograde flow of reactor contents to the valve. However, it is within the scope of the invention to convey the entire fluid feed through the conduit. It is preferred to use a liquid, such as the diluent in the reactor, although a gas is employable so long as retrograde flow is prevented.

A more complete understanding of the invention may be had by reference to the accompanying schematic drawing which is an elevation of an upright loop reactor.

Referring to the drawing, reactor 10 is a rectangular shaped, upright loop reactor constructed of interconnected, flanged, straight pipe sections and ells to provide a continuous path which is substantially free from interior obstructions. Other types of reaction vessels to which the invention is applicable include other shapes of continuous path loop reactors, e.g., horizontal or vertical, single or multiple loops, not necessarily of a rectangular configuration. Each straight pipe section is encased by jacket 12 containing an inlet 14 and outlet 16 for the introduction and removal, respectively, of heat exchange fluid. Conduit 18 is provided for the introduction of catalyst and diluent and is located either upstream or downstream of the hereinafter described impelling means. Although the impeller may be located in a number of positions, a frequently desirable position is in a horizontal leg where there is the greatest tendency for polymer to deposit. One convenient means of propelling the contents is by the use of an impeller 40 positioned on assembly 26 driven by motor 32 operatively connected to the impeller with shaft 24. Preferably the olefin feed is introduced through line 20 into the outboard seal and bearing assembly 22 from which it passes along shaft 24 into the reactor space around the impellers positioned on assembly 26. Seal coolant is introduced through line 28 and vented through line 30. Preferably, the makeup diluent is introduced through line 18 along with the catalyst. Preferably, the recycle diluent, recovered from the effluent withdrawn through line 36, is introduced through line 34 to line 20 from which it passes along shaft 24 to the impeller. The purpose of introducing the diluent olefin into the internal bearing assembly is to prevent the deposition of polymer in and around the propelling mechanism thereby forestalling stoppages due to motor failure. Alternatively, olefin and a portion of the recycle diluent may be introduced through line 51 into the discharge of the pump impeller. Any suitable means for propelling the diluent through the reactor in the highly turbulent flow range and at a velocity sufficient to prevent polymer deposition is satisfactory. Straightening vanes 46 consisting of plates are welded to the reactor interior wall to assist in stabilizing the direction of flow through the reactor. A pressure relief valve 42 is in open communication with the interior of the reactor 10 through conduit 43. This pressure relief valve is so designed so as to open when the pressure within the reactor exceeds a predetermined value thereby permitting passage of the reactor contents through conduit 43, relief valve 42 and conduit 44. This material may discharge into the atmosphere, a flare, or to a recovery tank. When operating at a pressure of 450 p.s.i.g. and using a steel Consolidated No. 1910-30-FC valve as hereinbefore described with a 1½ inch inlet and a 2 inch outlet, the valve is set at 625 p.s.i.g.

By the method and apparatus of this invention diluent is continuously injected into conduit 43 via conduit 46 at a rate sufficient to insure the continuous flow of fluid into the reactor, e.g. 1 to 100 g.p.h., preferably 2 to 10 g.p.h., thereby precluding the passage of reactor contents into the relief valve or passageway 43 in the absence of excessive pressure. The pressure of the diluent will be just sufficient to insure positive flow; that is, if the pressure within the reactor is 450 p.s.i. it is then necessary that the diluent pressure exceed 450 p.s.i. but not exceed the predetermined value set on the pressure relief valve. Generally, conduit 46 will contain a check valve 52 to prevent passage of the reactor contents into conduit 46 in the event of a pressure upset.

A conduit 48 and valve 50 are connected to an upper portion of the reactor to permit the manual release of air and other gases during startup or during other periods when it is necessary to release gases from the reactor.

The following data is presented to illustrate the invention. Ethylene and butene-1 are introduced into a loop reactor of the type shown in the drawing. The loop reactor has a uniform 16-inch internal diameter, a capacity of 2,603 gallons, and is operated at a pressure of 450 p.s.i.g. with a reaction temperature of 205° F. The inlet coolant temperature is 190° F. and the outlet temperature is 203° F. Ethylene feed rate is 630 pounds per hour, and butene-1 feed rate is 20 pounds per hour. In addition, a total of 140 gallons per hour of normal pentane is introduced into the reactor, of which 5 gallons per hour flushes relief valve 42 and conduit 43, and approximately 25 gallons per hour is introduced with about 0.12 pound per hour of chromium oxide-containing catalyst. The pressure relief valve is preset at a pressure of 625 p.s.i.g. with the incoming diluent through conduit 46 having a pressure of 550 p.s.i.g. Approximately 575 pounds per hour of copolymer is produced which is withdrawn through conduit 36. The copolymer had a high-load melt index [1] of 1.99 and a density [2] of 0.940 gram/cc.

Due to reaction upsetting factors, such as a blockage of the product removal conduit, or a failure in the cooling system, or excessive heat input, such as a fire around the reactor, the reaction pressure suddenly exceeds 625 p.s.i.g. resulting in the expulsion a portion of the reactor contents through conduit 43, relief valve 42 and conduit 44. Check valve 52 in diluent conduit 46 prevents the flow of reactor contents toward the diluent source.

While certain examples, structures, compositions and process steps have been described for purpose of illustration, the invention is not limited to these. Variation and modification within the scope of the disclosure and the claims can readily be effected by those skilled in the art.

What we claim is:

1. In a process for relieving excessive pressure in a pressurized polymerization zone comprising a smooth continuous path reaction zone wherein a monomer is polymerized in the presence of a catalyst and diluent under conditions of temperature and pressure such that all the diluent is in the liquid phase and at least part of the polymer produced is insoluble, excessive pressure surges being relieved by a pressure relief valve connected by a fluid passageway to said zone preset at a predetermined value, the improvement comprising continuously introducing said diluent into the passageway connecting the pressure relief valve and said reaction zone, said diluent having pressure not exceeding said predetermined value and having continuous positive flow toward said zone, thereby preventing contact of the contents of said zone with the relief valve.

2. In a process for relieving excessive pressure in a pressurized polymerization zone comprising a smooth continuous path reaction zone wherein a 1-olefin is polymerized by contacting said 1-olefin with a catalyst and a diluent under conditions of turbulent flow and at a temperature and pressure such that substantially all the diluent is in the liquid phase, the polymer produced is insoluble in said diluent and is in the form of solid particulate polymer having a density greater than said diluent, excessive pressure surges being relieved by a pressure relief valve connected by a fluid passageway to said zone preset at a predetermined value, the improvement comprising continuously introducing said diluent into the passageway connecting the pressure relief valve and said reaction zone, said diluent having pressure not exceeding said predetermined value and having continuous positive flow toward said zone, thereby preventing contact of the contents of said zone with the relief valve.

3. In a process for relieving excessive pressure in a pressurized reaction zone wherein ethylene and butene-1 are copolymerized by contacting said monomers in the presence of liquid normal pentane and a chromium oxide catalyst containing hexavalent chromium associated with an oxide selected from the group consisting of silica, alumina, thoria and zirconia within a smooth, closed continuous path reaction zone at a velocity sufficient to prevent polymer deposition and in the highly turbulent flow range and at a pressure in the range of 150 to 600 p.s.i.g. and temperature in the range of between 225° F. and about 150° F., said temperature being sufficient to maintain substantially all the diluent in the liquid phase, whereby substantially all the polymer product is insoluble and suspended in said liquid normal pentane and is in the form of solid particles of polymer, excessive pressure being relieved by means of a pressure valve connected by a passageway to the reaction zone and preset at a value exceeding the reaction zone pressure, the improvement comprising continuously introducing normal pentane into said passageway at a pressure exceeding the reactor pressure but less than said preset value and a flow rate in the range of 1 to 100 gallons per minute, thereby preventing contact of the materials within the vessel with the pressure relief valve.

4. The process of claim 3 wherein said normal pentane is introduced into said passage at a pressure in the range of 500 to 700 p.s.i.g. and a flow rate of 2 to 10 gallons per minute, said values not exceeding the preset value but exceeding the reactor pressure.

---

[1] The method of ASTM D-1238–52T was used except that the polymer sample is allowed to extrude from the test apparatus for 9 minutes at which time the extrudate is cut off with a spatula. The extrudate is cut off again at the end of 11 minutes. The 9 to 11 minute cut is weighed. This weight is multiplied by 5 and reported as the melt index value. This test is run under high load conditions (21,600 gms.).

[2] Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

References Cited by the Examiner

UNITED STATES PATENTS

| | | | |
|---|---|---|---|
| 2,351,091 | 6/1944 | Bar | 23—288 |
| 2,376,833 | 5/1945 | Teter | 23—288 |
| 2,810,630 | 10/1957 | Herle | 23—285 |
| 2,824,090 | 2/1958 | Edwards et al. | 260—88.2 |
| 2,825,721 | 3/1958 | Hogan et al. | 260—88.2 |
| 2,832,674 | 4/1958 | Ranzenberger | 23—285 |
| 2,885,389 | 5/1959 | Schappert | 260—94.9 |
| 2,920,635 | 6/1960 | Wilson | 137—15 |
| 2,989,517 | 6/1961 | Hanson | 260—95 XR |

JOSEPH L. SCHOFER, Primary Examiner.

MARK LIEBMAN, Examiner.